United States Patent
Sheikh

(10) Patent No.: US 10,789,777 B1
(45) Date of Patent: Sep. 29, 2020

(54) GENERATING CONTENT FOR PRESENTATION BY A HEAD MOUNTED DISPLAY BASED ON DATA CAPTURED BY A LIGHT FIELD CAMERA POSITIONED ON THE HEAD MOUNTED DISPLAY

(71) Applicant: Facebook Technologies, LLC, Menlo Park, CA (US)

(72) Inventor: Yaser Sheikh, Pittsburgh, PA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/000,893

(22) Filed: Jun. 6, 2018

Related U.S. Application Data

(60) Provisional application No. 62/526,725, filed on Jun. 29, 2017.

(51) Int. Cl.
*G02B 27/01* (2006.01)
*G06T 7/70* (2017.01)
(Continued)

(52) U.S. Cl.
CPC .......... *G06T 19/006* (2013.01); *G02B 27/017* (2013.01); *G02B 27/0172* (2013.01);
(Continued)

(58) Field of Classification Search
CPC .......... G06F 3/011; G06F 3/012; G06F 3/013; G06T 19/00; G06T 19/003; G06T 19/006; G06T 19/20; G06T 7/70; G06T 7/00; G06T 7/80; G06T 7/85; G06T 7/90; G06T 7/97; G06T 2027/10052; G06T 2207/10052;
(Continued)

(56) References Cited

U.S. PATENT DOCUMENTS

2014/0340389 A1* 11/2014 Lanman .................. G06T 15/04
345/419
2015/0054734 A1* 2/2015 Raghoebardajal ...... G06F 3/017
345/156
(Continued)

OTHER PUBLICATIONS

McMillan and Bishop, "Plenoptic Modeling: An Image-Based Rendering System", Proc. SIGGRAPH 95 (Aug. 6-11, 1995), p. 39-46. (Year: 1995).*
(Continued)

*Primary Examiner* — Julie Anne Watko
(74) *Attorney, Agent, or Firm* — Fenwick & West LLP

(57) ABSTRACT

A virtual reality (VR) head mounted display (HMD) includes a light field camera on an outside surface of the HMD facing away from the wearer. Light rays and intensity captured by the light field camera is communicated to a console that identifies a virtual position of the light field camera based on a relative position of the light field camera to the user's eye when wearing the HMD. Based on the virtual position, the console selects rays of light captured by the light field camera projected to intersect a field of view of the light field camera if located at the virtual position. From the selected rays and corresponding intensities, the console generates one or more images representing the environment surrounding the HMD, providing a representation of portions of the environment surrounding the HMD visible from the position of the user's eye.

16 Claims, 4 Drawing Sheets

(51) Int. Cl.
*G06F 3/01* (2006.01)
*G06T 19/00* (2011.01)

(52) U.S. Cl.
CPC ........ *G06T 7/70* (2017.01); *G02B 2027/0134* (2013.01); *G02B 2027/0138* (2013.01); *G06F 3/012* (2013.01); *G06F 3/013* (2013.01); *G06T 2207/10052* (2013.01)

(58) Field of Classification Search
CPC .. G02B 27/01; G02B 27/00; G02B 2027/011; G02B 2027/0112; G02B 2027/0129; G02B 2027/0132; G02B 2027/0134; G02B 2027/0136; G02B 2027/0138; G02B 2027/014; G02B 2027/015; G02B 2027/0152; G02B 2027/0161; G02B 2027/0163; G02B 27/017; G02B 2027/0197; G02B 2027/0187; G02B 2027/019; G02B 27/0189; G02B 2027/0105; G02B 27/0172; G02B 2027/0178; G03H 1/2294; G03H 2227/02
See application file for complete search history.

(56) References Cited

U.S. PATENT DOCUMENTS

| 2015/0208060 A1* | 7/2015 | Kim .................. G06F 3/013 348/51 |
| 2017/0345213 A1* | 11/2017 | Ernst ................ G02B 27/0172 |
| 2018/0232047 A1* | 8/2018 | Yoon .................. G06T 7/90 |

OTHER PUBLICATIONS

Archambault, Michael, "The Science Behind Lytro's Light Field Technology and Megaray Sensors" (https://petapixel.com/2015/06/22/the-science-behind-lytros-light-field-technology-and-rnegaray-sensors/), published Jun. 22, 2015. (Year: 2015).*

Bishop and Favaro, "The Light Field Camera: Extended Depth of Field, Aliasing, and Superresolution", IEEE Transactions on Pattern Analysis and Machine Intelligence, v. 34, No. 5, p. 972-986 (May 2012). (Year: 2012).*

* cited by examiner

GENERATING CONTENT FOR PRESENTATION BY A HEAD MOUNTED DISPLAY BASED ON DATA CAPTURED BY A LIGHT FIELD CAMERA POSITIONED ON THE HEAD MOUNTED DISPLAY

CROSS-REFERENCE TO RELATED APPLICATIONS

This application claims the benefit of U.S. Provisional Application No. 62/526,725, filed Jun. 29, 2017, which is incorporated by reference in its entirety.

BACKGROUND

The present disclosure generally relates to head mounted displays, and more specifically relates to generating content for presentation by a head mounted display.

Virtual reality (VR) systems, or augmented reality (AR) systems, can leverage the capture of the environment surrounding a user to generate content for presentation to the user. For example, a VR system generates content replicating an environment surrounding a user and presents the generated content to the user via a head mounted display (HMD). However, many conventional architectures for capturing an environment surrounding a user are relatively large, heavy, and consume significant amounts of power. For example, conventional approaches for capturing the environment surrounding a user position cameras on the HMD positioned to capture the environment surrounding the user and generate a representation of the environment for presentation to the user via the HMD by analyzing the captured images. However, such configurations increase the size, weight, and power consumption of the HMD, and require significant computational power resources to generate representations of the environment surrounding the user for presentation via the HMD. Additionally, conventional methods for generating representations of the environment surrounding the user may introduce significant latency in content presented to the user via the HMD because of the amount of time to generate a representation of the environment surrounding the user, delaying presentation of the representation of the environment surrounding the user via the HMD, which may impair presentation of content to the user via the HMD.

SUMMARY

A head-mounted display (HMD) in a virtual reality (VR) system or in an augmented reality (AR) system includes an electronic display presenting content to a user. Additionally, the HMD includes a light field camera positioned on an exterior surface and facing away from the user. Hence, the light field camera captures intensity of light within an environment surrounding the HMD, as well as directions that light rays captured by the light field camera are travelling. The light field camera is positioned on the HMD in a specific position relative to a location of the user's eye when the user is wearing the HMD.

The light field camera is coupled to a console or other device that identifies a virtual position for the light field camera based on the position of the user's eye relative to the position of the light field camera on the HMD. Based on the virtual position, the console selects rays of light captured by the light field camera projected to intersect a plane in the virtual position corresponding to a field of view of the light field camera if located at the virtual position. Based on intensities corresponding to the selected rays, the console generates one or more images representing the environment surrounding the HMD. Generating the one or more images from the selected rays captured by the light field camera allows the one or more images to represent portions of the environment surrounding the HMD visible from the position of the user's eye when wearing the HMD. Unlike conventional methods that present images captured by a light field camera in a different position than the position of the user's eye, causing images having incorrect perspective relative to the position of the user's eye, generating images of the environment surrounding the HMD from selected rays of light captured by the light field camera projected to intersect a plane in the virtual position allows the generated images to more accurately represent the environment surrounding the HMD to the user. Additionally, many conventional techniques to reconstruct the environment surrounding the HMD from images captured by a light field camera are computationally intensive and may be unable to reconstruct portions of the environment surround the HMD, while generating images of the environment surrounding the HMD from selected rays of light captured by the light field camera projected to intersect a plane in the virtual position more efficiently uses computational resources to generate a representation of the environment surrounding the HMD for the user.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
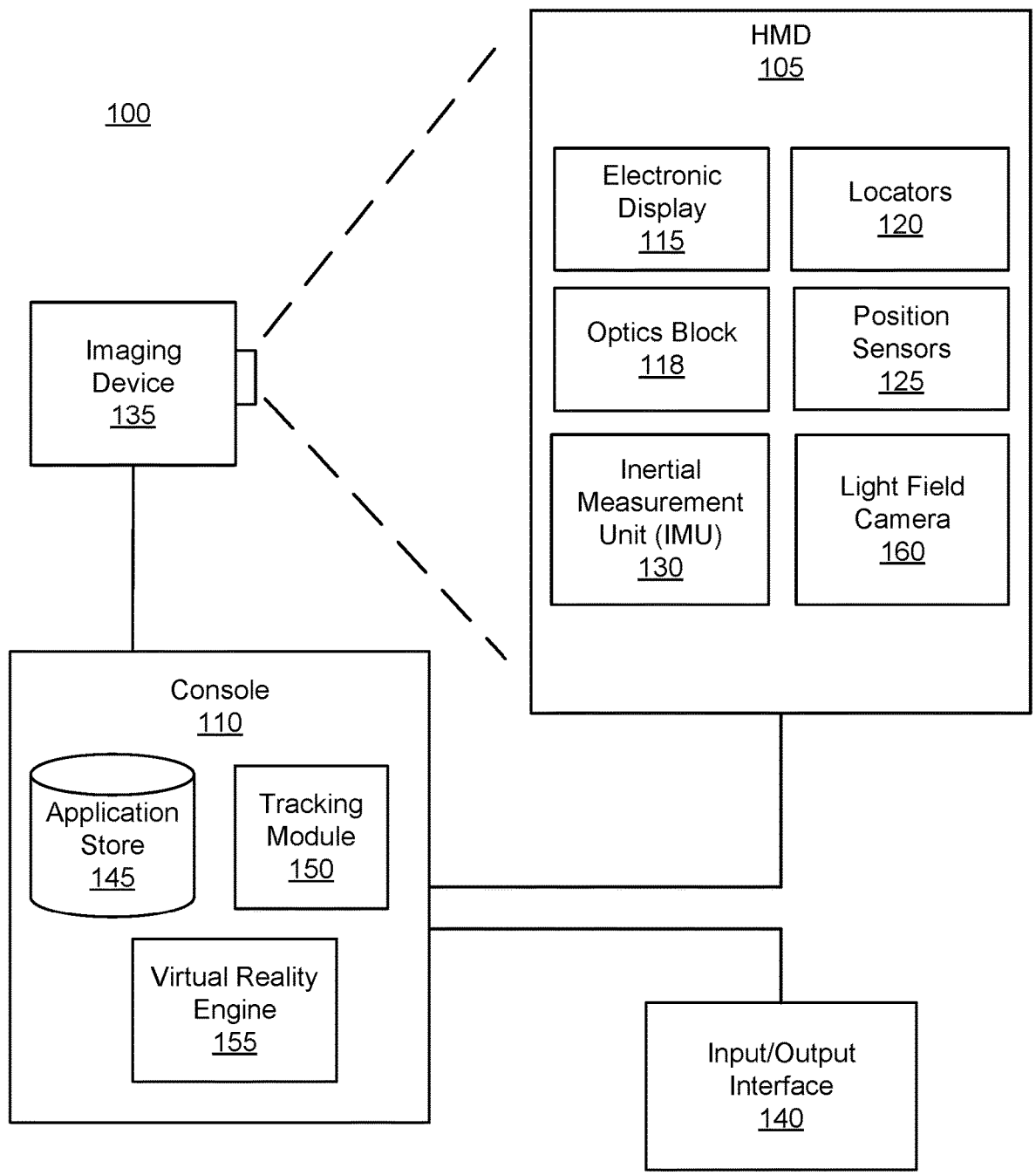
FIG. 1 is a block diagram of a virtual reality or an augmented reality system environment, in accordance with an embodiment.

FIG. 1 is a block diagram of a system environment 100 for providing virtual reality (VR) content or augmented reality (AR) content in accordance with an embodiment. The system environment 100 shown by FIG. 1 comprises a head mounted display (HMD) 105, an imaging device 135, and an input/output (I/O) interface 140 that are each coupled to a console 110. While FIG. 1 shows an example system environment 100 including one HMD 105, one imaging device 135, and one I/O interface 140, in other embodiments, any number of these components are included in the system environment 100. For example, an embodiment includes multiple HMDs 105 each having an associated I/O interface 140 and being monitored by one or more imaging devices 135, with each HMD 105, I/O interface 140, and imaging device 135 communicating with the console 110. In alternative configurations, different and/or additional components may be included in the system environment 100.

The HMD 105 presents content to a user. Examples of content presented by the HMD 105 include one or more images, video, audio, or some combination thereof. In some embodiments, audio is presented via an external device (e.g., speakers and/or headphones) that receives audio information from the HMD 105, the console 110, or both, and presents audio data based on the audio information. An embodiment of the HMD 105 is further described below in conjunction with FIGS. 3 and 4. In one example, the HMD 105 comprises one or more rigid bodies, which are rigidly or non-rigidly coupled to each other. A rigid coupling between rigid bodies causes the coupled rigid bodies to act as a single rigid entity. In contrast, a non-rigid coupling between rigid bodies allows the rigid bodies to move relative to each other.

The HMD 105 includes an electronic display 115, an optics block 118, one or more locators 120, one or more position sensors 125, an inertial measurement unit (IMU) 130, and a facial tracking system 160. The electronic display 115 displays images to the user in accordance with data received from the console 110. In various embodiments, the electronic display 115 may comprise a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMOLED), some other display, or some combination thereof.

The optics block 118 magnifies received image light from the electronic display 115, corrects optical errors associated with the image light, and presents the corrected image light to a user of the HMD 105. In an embodiment, the optics block 118 includes one or more optical elements and/or combinations of different optical elements. For example, an optical element is an aperture, a Fresnel lens, a convex lens, a concave lens, a filter, or any other suitable optical element that affects the image light emitted from the electronic display 115. In some embodiments, one or more of the optical elements in the optics block 118 may have one or more coatings, such as anti-reflective coatings.

Magnification and focusing of the image light by the optics block 118 allows the electronic display 115 to be physically smaller, weigh less, and consume less power than larger displays. Additionally, magnification may increase a field of view of the displayed content. For example, the field of view of the displayed content is such that the displayed content is presented using almost all (e.g., 110 degrees diagonal), and in some cases all, of the user's field of view. In some embodiments, the optics block 118 is designed so its effective focal length is larger than the spacing to the electronic display 115, which magnifies the image light projected by the electronic display 115. Additionally, in some embodiments, the amount of magnification may be adjusted by adding or removing optical elements.

In an embodiment, the optics block 118 is designed to correct one or more types of optical errors. Examples of optical errors include: two-dimensional optical errors, three-dimensional optical errors, or some combination thereof. Two-dimensional errors are optical aberrations that occur in two dimensions. Example types of two-dimensional errors include: barrel distortion, pincushion distortion, longitudinal chromatic aberration, transverse chromatic aberration, or any other type of two-dimensional optical error. Three-dimensional errors are optical errors that occur in three dimensions. Example types of three-dimensional errors include spherical aberration, comatic aberration, field curvature, astigmatism, or any other type of three-dimensional optical error. In some embodiments, content provided to the electronic display 115 for display is pre-distorted, and the optics block 118 corrects the distortion when it receives image light from the electronic display 115 generated based on the content.

The HMD 105 may include various locators 120 in some embodiments. The locators 120 are objects located in specific positions on the HMD 105 relative to one another and relative to a specific reference point on the HMD 105. For example, a locator 120 is a light emitting diode (LED), a corner cube reflector, a reflective marker, a type of light source that contrasts with an environment in which the HMD 105 operates, or some combination thereof. In embodiments where the locators 120 are active (i.e., an LED or other type of light emitting device), the locators 120 may emit light in the visible band (i.e., ~380 nm to 750 nm), in the infrared (IR) band (i.e., ~750 nm to 1 mm), in the ultraviolet band (i.e., 10 nm to 380 nm), in some other portion of the electromagnetic spectrum, or in some combination thereof.

In some embodiments, the locators 120 are located beneath an outer surface of the HMD 105, which is transparent to the wavelengths of light emitted or reflected by the locators 120 or is thin enough not to substantially attenuate the wavelengths of light emitted or reflected by the locators 120. Additionally, in some embodiments, the outer surface or other portions of the HMD 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the HMD 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the HMD 105 relative to an initial position of the HMD 105. For example, the position sensors 125 include multiple accelerometers to measure translational motion (forward/back, up/down, and left/right) and multiple gyroscopes to measure rotational motion (e.g., pitch, yaw, and roll). In some embodiments, the IMU 130 rapidly samples the measurement signals and calculates the estimated position of the HMD 105 from the sampled data. For example, the IMU 130 integrates the measurement signals received from the accelerometers over time to estimate a velocity vector and integrates the velocity vector over time to determine an estimated position of a reference point on the HMD 105. Alternatively, the IMU 130 provides the sampled measurement signals to the console 110, which determines the fast calibration data. The reference point is a point describing the position of the HMD 105. While the reference point may generally be defined as a point in space, in practice, the reference point is defined as a point within the HMD 105 (e.g., a center of the IMU 130).

The IMU 130 receives one or more calibration parameters from the console 110. As further discussed below, the one or more calibration parameters are used to maintain tracking of the HMD 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The light field camera 160 is an image capture device configured to capture information describing intensity of light at different locations within a field of view of the light field camera 160 as well as directions that rays of captured light within the field of view are travelling. In various embodiments the light field camera 160 comprises an array of microlenses positioned between an image sensor and an environment external to the image sensor, allowing capture of intensity, color, and directional information of light captured from different locations within the field of view of the image sensor. For example, multiple microlenses are poisoned one focal length away from an image plane of the image sensor; however, in other embodiments, the microlenses may be positioned before or behind a focal plane of the image sensor. Alternatively, the light field camera 160 comprises multiple micro-image sensors (e.g., micro-cameras) having less than a threshold distance between each other. The light field camera 160 is positioned on an outer surface of the HMD 105 and positioned to capture intensity and direction information of light rays captured from locations within an environment external to the HMD 105. For example, the light field camera 160 is positioned on an exterior surface of the HMD 105 and configured to capture intensity and direction information of light captured within a field of view of the light field camera 160 that is external to the HMD 105. The light field camera 160 communicates the captured intensity and direction information to the console 110, which generates one or more images representing the environment surrounding the HMD 105 based on the intensity and direction information received from the light field camera 160, as further described below in conjunction with FIG. 4.

The imaging device 135 generates slow calibration data in accordance with calibration parameters received from the console 110. Slow calibration data includes one or more images showing observed positions of the locators 120 that are detectable by the imaging device 135. In some embodiments, the imaging device 135 includes one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retro-reflect the light towards the light source in the imaging device 135. Slow calibration data is communicated from the imaging device 135 to the console 110, and the imaging device 135 receives one or more calibration parameters from the console 110 to adjust one or more imaging parameters (e.g., focal length, focus, frame rate, ISO, sensor temperature, shutter speed, aperture, etc.).

The input/output (I/O) interface 140 is a device that allows a user to send action requests to the console 110 and to receive responses from the console 110. An action request is a request to perform a particular action. For example, an action request may be to start or end an application or to perform a particular action within the application. The I/O interface 140 may include one or more input devices. Example input devices include: a keyboard, a mouse, a game controller, or any other suitable device for receiving action requests and communicating the received action requests to the console 110. An action request received by the I/O interface 140 is communicated to the console 110, which performs an action corresponding to the action request. In some embodiments, the I/O interface 140 may provide haptic feedback to the user in accordance with instructions received from the console 110. For example, haptic feedback is provided when an action request is received or when the console 110 communicates instructions to the I/O interface 140 causing the I/O interface 140 to generate haptic feedback when the console 110 performs an action.

The console 110 provides content to the HMD 105 for presentation to a user in accordance with information received from one or more of: the imaging device 135, the HMD 105, and the I/O interface 140. In the example shown in FIG. 1, the console 110 includes an application store 145, a tracking module 150, and a virtual reality (VR) engine 155. Some embodiments of the console 110 have different modules than those described in conjunction with FIG. 1. Similarly, the functions further described below may be distributed among components of the console 110 in a different manner than is described here.

The application store 145 stores one or more applications for execution by the console 110. An application is a group of instructions, that when executed by a processor, generates content for presentation to the user. Content generated by an application may be in response to inputs received from the user via movement of the HMD 105 or the I/O interface 140. Examples of applications include: gaming applications, conferencing applications, video playback application, or other suitable applications.

The tracking module 150 calibrates the system environment 100 using one or more calibration parameters and may adjust one or more calibration parameters to reduce error in determination of the position of the HMD 105. For example, the tracking module 150 adjusts the focus of the imaging device 135 to obtain a more accurate position for observed locators 120 on the HMD 105. Moreover, calibration performed by the tracking module 150 also accounts for information received from the IMU 130. Additionally, if tracking of the HMD 105 is lost (e.g., the imaging device 135 loses line of sight of at least a threshold number of the locators 120), the tracking module 140 re-calibrates some of or all of the entire system environment 100.

The tracking module 150 tracks movements of the HMD 105 using slow calibration information from the imaging device 135. The tracking module 150 determines positions of a reference point of the HMD 105 using observed locators 120 on the HMD 105 from the slow calibration information and a model of the HMD 105. The tracking module 150 also determines positions of a reference point of the HMD 105 using position information from the fast calibration information. Additionally, in some embodiments, the tracking module 150 uses portions of the fast calibration information, the slow calibration information, or some combination thereof, to predict a future location of the HMD 105. The tracking module 150 provides the estimated or predicted future position of the HMD 105 to the VR engine 155.

The VR engine 155 executes applications within the system environment 100 and receives position information, acceleration information, velocity information, predicted future positions, or some combination thereof of the HMD 105 from the tracking module 150. Based on the received information, the VR engine 155 determines content to provide to the HMD 105 for presentation to a user. For example, if the received information indicates that the user has looked to the left, the VR engine 155 generates content for the HMD 105 that mirrors the user's movement in a virtual environment. In various embodiments, the VR engine 155 receives information from the light field camera 160 included on the HMD 105 and generates one or more images based on the received information. As further described below in conjunction with FIG. 4, the VR engine 155 generates one or more images replicating the environment external to the HMD 105 based on the information from the light field camera 160. The VR engine 155 communicates the generated one or more images to the HMD 150 for presentation to the user. Additionally, the VR engine 155 performs an action within an application executing on the console 110 in response to an action request received from the I/O interface 140 and provides feedback to the user that the action was performed. For example, the provided feedback includes visual or audible feedback via the HMD 105 or haptic feedback via the I/O interface 140.

Head Mounted Display Including Light Field Camera

Figure 2:
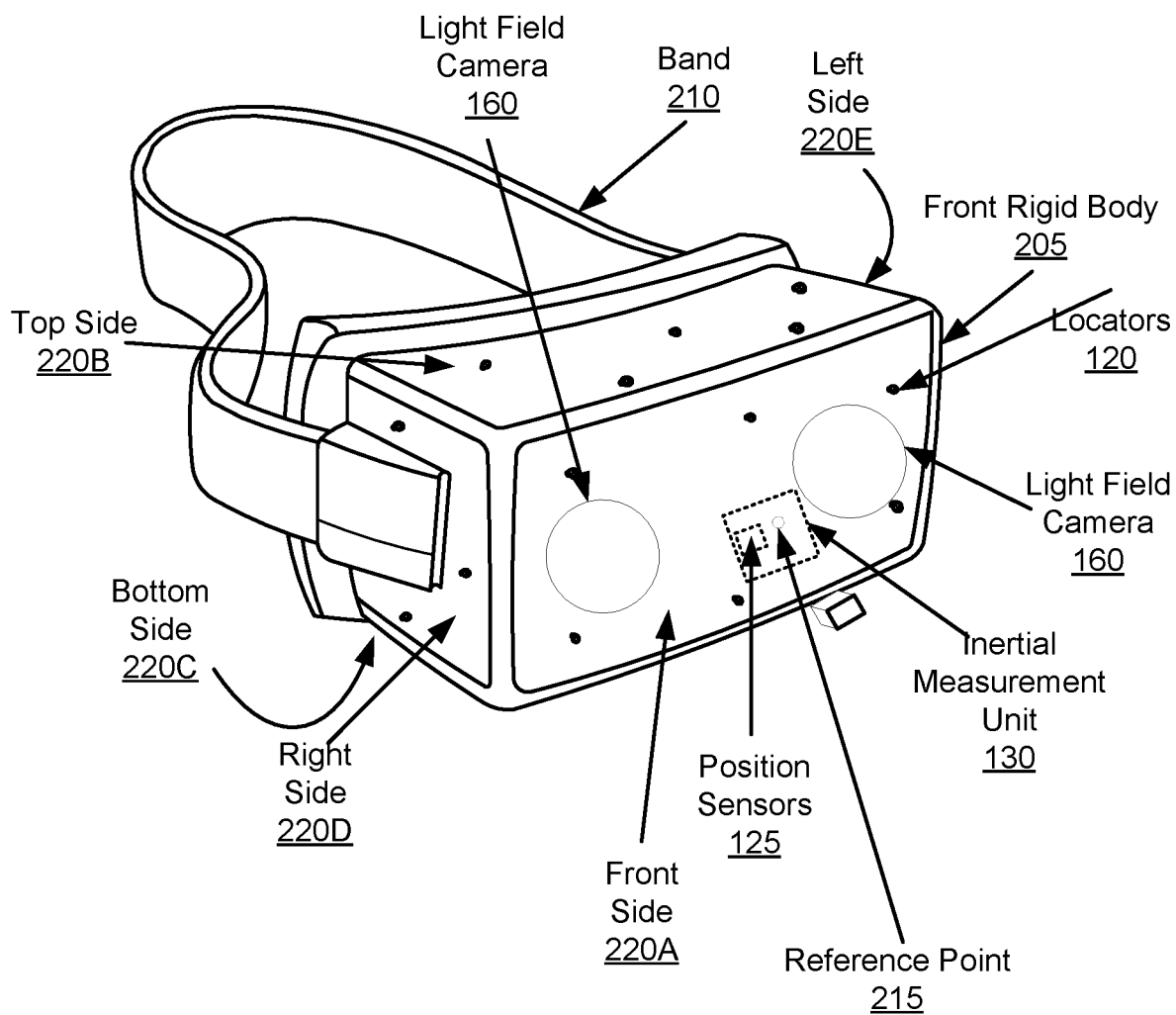
FIG. 2 is a wire diagram of a virtual reality head mounted display, in accordance with an embodiment.

FIG. 2 is a wire diagram of one embodiment of a HMD 200. The HMD 200 shown in FIG. 2 is an embodiment of the HMD 105 that includes a front rigid body 205 and a band 310. The front rigid body 205 includes the electronic display 115 (not shown in FIG. 3), the IMU 130, the one or more position sensors 125, and the locators 120. In the embodiment shown by FIG. 2, the position sensors 125 are located within the IMU 130, and neither the IMU 130 nor the position sensors 125 are visible to the user.

The locators 120 are located in fixed positions on the front rigid body 305 relative to one another and relative to a reference point 215. In the example of FIG. 2, the reference point 215 is located at the center of the IMU 130. Each of the locators 120 emit light that is detectable by the imaging device 135. Locators 120, or portions of locators 120, are located on a front side 220A, a top side 220B, a bottom side 220C, a right side 220D, and a left side 220E of the front rigid body 205 in the example shown in FIG. 2.

In the example of FIG. 2, the HMD 200 includes multiple light field cameras 160 coupled to the front side 220A of the HMD 200 and positioned so a field of view of the light field camera 160 captures an environment external to the HMD 200 and at least partially in front of the front side 220A of the HMD 200. For example, the light field cameras 160 are positioned on the front side 220A of the HMD 200 in locations corresponding to positions of the user's eyes within the HMD 200. For example, a light field camera 160 is positioned on the front side 220A of the HMD 200 in a plane parallel to a plane including a right eye of the user, where a normal of the plane including the light field camera 160 is perpendicular to the plane including the right eye of the user. In some embodiments, the light field camera 160 is positioned on the front side 220A of the HMD 200 so a center of the light filed camera 160 and a center of the user's right eye are aligned along an axis. A second light filed camera 160 may be similarly positioned on the front side 220A of the HMD 200 relative to the left eye of the user. However, in other embodiments, the light field camera 160 is coupled to any suitable side of the HMD 200 and configured so the field of view of the light field camera 160 includes one or more portions of the environment external to the HMD 200.

A light field camera 160 captures intensity and direction information of light from various positions within the environment external to the HMD 200. For example, the light field camera 160 captures rays of light from different positions within the environment that includes intensity and direction information for each captured ray of light. Accordingly, data captured by the light field camera 160 includes captures intensity and direction of light captured within an environment surrounding the HMD 200. The light field camera 160 communicates the captured information to the console 110 in various embodiments, allowing the console 110 to generate one or more images representing the environment external to the HMD 200. In the example of FIG. 2, each light field camera 160 captures information and communicates the captured information to the console 110, allowing the console 110 to generate images representing the environment external to the left eye of the user and representing the environment external to the right eye of the user.

Figure 3:
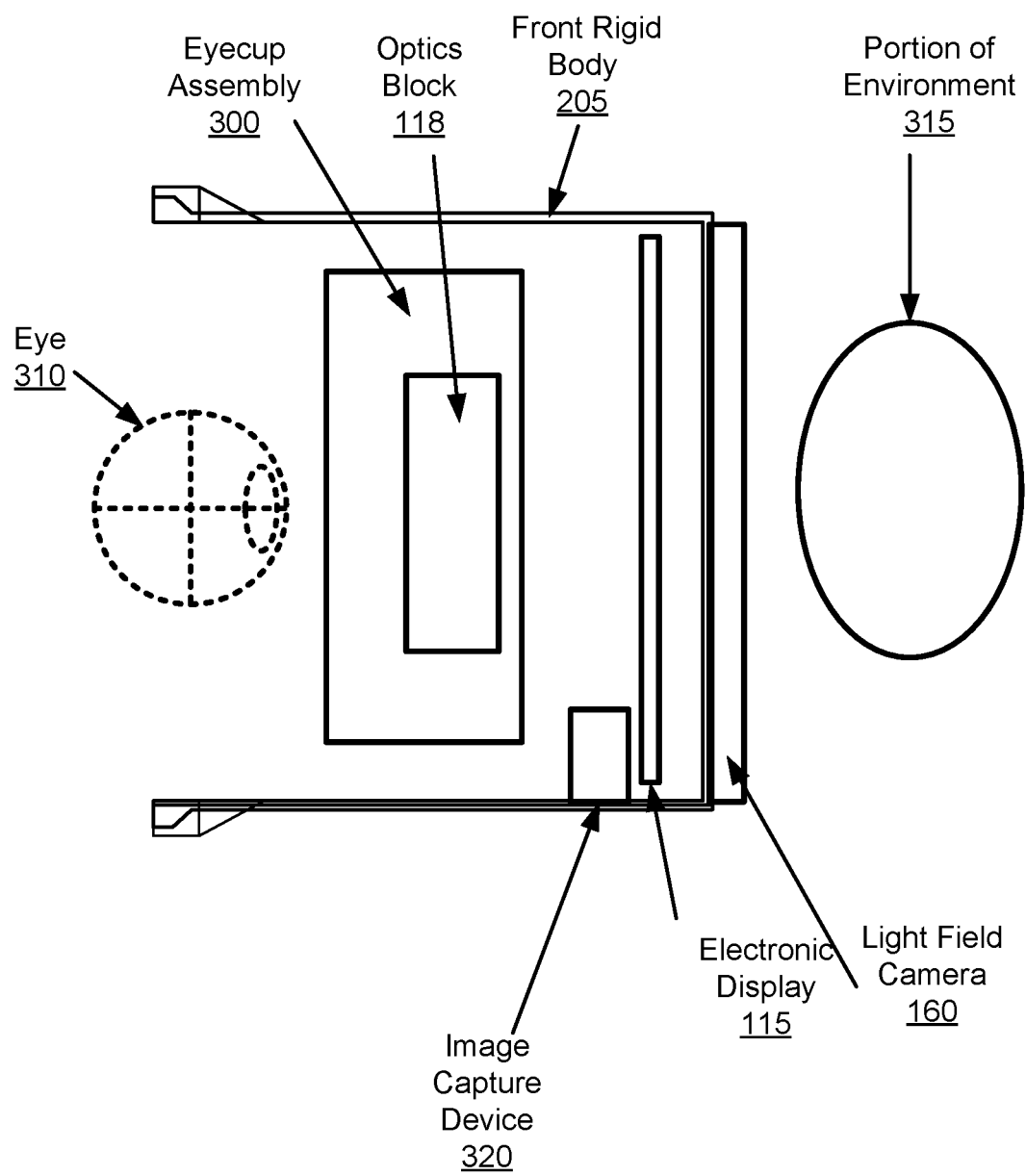
FIG. 3 is a cross section of the front rigid body of the virtual reality head mounted display in FIG. 2, in accordance with an embodiment.

FIG. 3 is a cross-sectional diagram of an embodiment of the front rigid body 205 of the HMD 200 shown in FIG. 2. In the embodiment shown in FIG. 3, the front rigid body 205 includes an eyecup assembly 300, a light field camera 160, an optics block 118, an electronic display 115, and an image capture device 320. While FIG. 3 shows a single eyecup assembly 300 for a single eye 310 of the user, another eyecup assembly is included in the front rigid body 205 for another eye of the user. Thus, the front rigid body 205 includes an eyecup assembly 300 for each of a user's eyes. The light field camera 160 is coupled to a front side of the front rigid body 205 in the example shown by FIG. 3 and positioned to capture images of a portion 315 of an environment external to the HMD 200. For purposes of illustration, FIG. 3 shows a single light field camera 160 coupled to the front side of the front rigid body 205; however, in various embodiments, any suitable number of light field camera 160 may be coupled to the front rigid body 205 and positioned to capture images of the portion 315 of the environment external to the HMD 200. Additionally, different light field cameras 160 may be configured to capture different portions of the environment external to the HMD 205 in various embodiments. For example, a light field camera 160 is positioned proximate to a portion of the HMD 205 including the user's right eye, while an additional light field camera 160 is positioned proximate to a portion of the HMD 205 including the user's left eye, with the light field camera 160 and the additional light field camera 160 configured to capture light from different portions 315 of the environment external to the HMD 205. While FIG. 3 shows the light field camera 160 coupled to an exterior surface of the front rigid body 205, in some embodiments the light field camera 160 is coupled to an interior surface of the front rigid body 205, which is transparent to or does not substantially attenuate wavelengths of light captured by the light field camera 160.

The front rigid body 205 includes an optical block 118 that magnifies image light from the electronic display 115, and in some embodiments, also corrects for one or more additional optical errors (e.g., distortion, astigmatism, etc.) in the image light from the electronic display 115. The optics block 118 directs the image light from the electronic display 115 to a pupil of the user's eye 310 by directing the altered image light to an exit pupil of the front rigid body 205 that is a location where the user's eye 310 is positioned when the user wears the HMD 200. For purposes of illustration, FIG. 3 shows a cross section of the right side of the front rigid body 305 (from the perspective of the user) associated with a single eye 310, but another optical block, separate from the optical block 118, provides altered image light to another eye (i.e., a left eye) of the user.

Additionally, the front rigid body 205 includes an image capture device 320 configured to capture images of portions of a face of a user of the HMD 200 including an eye of the user. Different image capture devices 320 may be included in the front rigid body 205 in various embodiments and capture images including different portions of the face of the user. For example, the image capture device 320 captures images including a right eye of the user while an additional image capture device 320 captured images including a left eye of the user. An image capture device 320 has a specific position relative to portions of the front rigid body 205 (e.g., a specific distance from the front surface of the front rigid body 205, a specific distance from the eyecup assembly 300, etc.). The image capture device 320 captures images based on light having particular wavelengths reflected by the portions of the user's face. For example, the image capture devices 320 captures infrared light reflected by portions of the user's face. In another example, the image capture device 320 captures visible light reflected by portions of the user's face. The image capture device 320 has various parameters such as focal length, focus, frame rate, ISO, sensor temperature, shutter speed, aperture, resolution, etc. In some embodiments, the image capture devices 320 has a high frame rate and high resolution. The image capture device 320 capture two-dimensional images or three-dimensional images in various embodiments.

In some embodiments, one or more illumination sources are coupled to one or more surfaces of the HMD 200 and are positioned to illuminate portions of the user's face. Illumination sources may be positioned at discrete locations along the HMD 200. In some embodiments, the one or more illumination sources are coupled to one or more exterior surfaces of the HMD 200. Additionally, one or more illumination sources may be positioned within a rigid body of the HMD 200 to illuminate portions of the user's face enclosed by the front rigid body 205 of the HMD 200. Example illumination sources include be light-emitting diodes (LEDs) that emit light in the visible band (i.e., ~380 nm to 750 nm), in the infrared (IR) band (i.e., ~750 nm to 1 mm), in the ultraviolet band (i.e., 10 nm to 380 nm), in some other portion of the electromagnetic spectrum, or in some combination thereof. In some embodiments, different illumination sources have different characteristics. As an example, different illumination sources emit light having different wavelengths or different temporal coherences describing correlation between light waves at different points in time. Further, light emitted by different illumination sources may be modulated at different frequencies or amplitudes (i.e., varying intensity) or multiplexed in a time domain or in a frequency domain.

Images captured by the image capture device 320 and information captured by the light field camera 160 are communicated to the console 110 in various embodiments. Based on the images from the image capture device 320, the console 110 determines a position of the user's eye included in the captured images within the HMD 200. The console uses the determined position of the user's eye to select information captured from the light field camera 160, as further described below in conjunction with FIG. 4.

Figure 4:
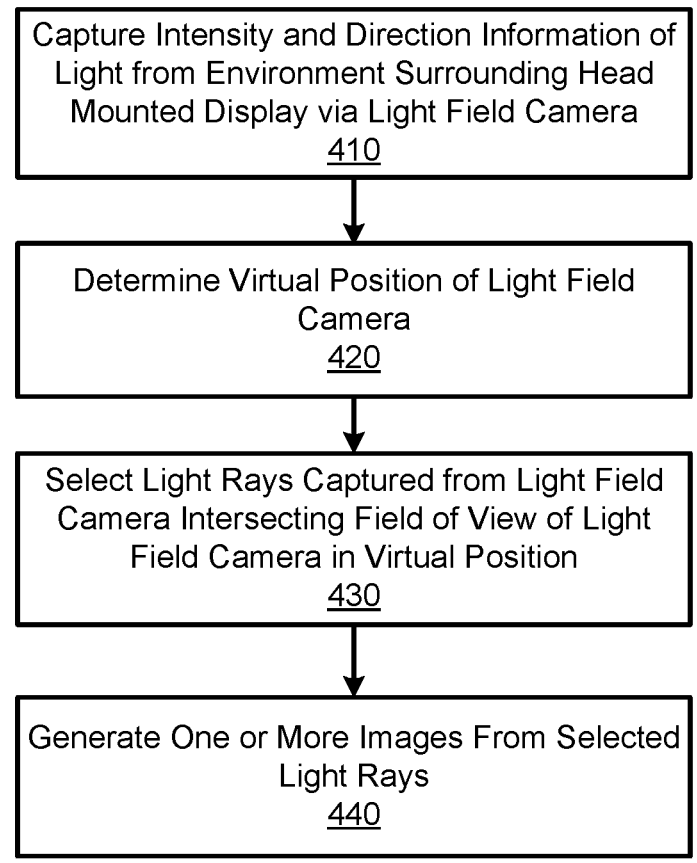
FIG. 4 is a flowchart of a method for generating a graphical representation of an environment surrounding a user wearing a head mounted display, in accordance with an embodiment.

Generating Content Based on Data Captured by a Light Field Camera Coupled to a HMD FIG. 4 is a flowchart of one embodiment of a method for generating a graphical representation of an environment surrounding a user wearing a head mounted display (HMD) 105. The method described in conjunction with FIG. 4 may be performed by the console 110 in various embodiments, while other devices may perform some or all of the steps of the method in other embodiments. Embodiments of the method may include different or additional steps than those described in conjunction with FIG. 4. Additionally, in some embodiments, steps of the method may be performed in different orders than the order described in conjunction with FIG. 4.

A HMD 105 includes a light field camera 160 positioned on the HMD 105 to capture 410 information about light from an environment external to the HMD 105. Hence, the light field camera 160 is positioned on the HMD 105 so a field of view of the light field camera 160 is external to the HMD 105. The light field camera 160 captures 410 intensity and direction information of light captured from positions within the environment external to the HMD 105. Accordingly, the light field camera 160 captures intensity and direction of rays of light captured from the environment external to the HMD 105. The light field camera 160 also has a specific position on the HMD 105 relative to a location of a user's eye when the user is wearing the HMD 105. For example, the light field camera 160 has a specific horizontal distance and a specific vertical distance from a center of an eyecup assembly 300 of the HMD 105.

The light field camera 160 provides the captured intensity and direction information to a console 110 or to another device that determines 420 a virtual position of the light field camera 160 based on the specific position of the light field camera on the HMD 105. In various embodiments, the console 110 or other device receives images of an eye of the user captured by an image capture device 320 included in the front rigid body 205 of the HMD 105, as further described above in conjunction with FIG. 3. From the captured images and the specific position of the image capture device 320 relative to other portions of the HMD 105, the console 110 determines a position of the user's eye when wearing the HMD 105. The determined virtual position corresponds to the position of the user's eye when wearing the HMD 105 determined from the captured images received from the image capture device 320. In some embodiments, the light field camera 160 also provides the specific horizontal distance and the specific vertical distance from the center of the eyecup assembly 300 and the light field camera 160 to the console 110 during a configuration process or with the captured intensity and direction information. In some embodiments, the console 110 offsets the position of the light field camera 160 by the specific horizontal distance and specific vertical distance between the light field camera 160 and the center of the eyecup assembly 300 of the HMD 105 and accounts for the position of the user's eye determined from the images captured by the image capture device 320 when determining 420 the virtual position.

Based on the field of view of the light field camera 160, the console 110 selects 430 rays of light captured 410 by the light field camera 160 projected to intersect a plane in the virtual position corresponding to a field of view of the light field camera 160. Hence, the selected rays identify light that would have been captured by the light field camera 160 if it were physically located at the virtual position. For example, the console 110 uses direction information for captured rays of light from the light field camera 160 to project the captured rays of light to the virtual position and selects 430 rays of light projected to intersect a plane in the virtual position corresponding to the field of view of the light field camera 160.

From the selected rays of light, the console generates 440 one or more images representing the portion of the environment from which the light field camera 160 captured 410 the intensity and direction information. To generate 440 the one or more images, the console 110 retrieves intensity information corresponding to each of the selected rays of light and generates 440 the one or more images so intensities at positions within an image correspond to intensities of selected rays of light intersecting the plane in the virtual position at the corresponding positions. If the light field camera 160 captured 410 color information along with intensity for the rays of light, the console 110 accounts for the color information corresponding to each selected ray when generating 440 the one or more images. By generating 440 the one or more images from the selected rays captured 410 by the light field camera 160, the console 110 generates 440 images representing portions of the environment surrounding the HMD 105 visible from the position of the user's eye when wearing the HMD 105. This allows the generated one or more images to more accurately represent the environment surrounding the HMD 105 than images generated from shifting the intensity and direction information captured 410 by the light field camera 160 to the position of the user's eyes in the HMD 105.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    capturing information about light from an environment external to a head mounted display (HMD) using a light field camera positioned on the HMD so a field of view of the light field camera is external to the HMD, the light field camera having a specific position on the HMD relative to an eye of a user wearing the HMD;
    determining a virtual position of the light field camera based on the specific position of the light field camera on the HMD relative to the eye of the user wearing the HMD by
        obtaining an image of the user's eye from a camera included in the front rigid body that is directed towards the user's eye and that has specific position relative to a portion of the HMD, and
        determining a position of the user's eye from the image and the specific position relative to the portion of the HMD, the virtual position of the light field camera comprising the determined position of the user's eye;
    selecting rays of light captured by the light field camera projected to intersect a plane in the virtual position of the light field camera and corresponding to the field of view of the light field camera; and
    generating one or more images representing a portion of the environment external to the HMD from the selected rays of light captured by the light field camera that are projected to intersect the plane in the virtual position of the light field camera and corresponding to the field of view of the light field camera.

2. The method of claim 1, wherein determining the position of the user's eye from the image and the specific position relative to the portion of the HMD comprises:
    obtaining a specific horizontal distance from a center of an eyecup assembly included in the HMD from the light field camera;
    obtaining a specific vertical distance from the center of the eyecup assembly included in the HMD from the light field camera; and
    determining the position of the user's eye within the HMD from the one or more images of the eye of the user obtained from the camera, the specific position relative to the portion of the HMD, the specific horizontal distance, and the specific vertical distance.

3. The method of claim 1, wherein the information about light from the environment external to the HMD comprises intensity and direction of rays of light external to the HMD captured by the light field camera.

4. The method of claim 3, wherein selecting rays of light captured by the light field camera projected to intersect the plane in the virtual position of the light field camera and corresponding to the field of view of the light field camera comprises:
projecting rays of light captured by the light field camera to the virtual position based on the direction of rays of light external to the HMD captured by the light field camera; and
selecting rays of light projected to intersect the plane in the virtual position of the light field camera corresponding to the field of view of the light field camera.

5. The method of claim 4, wherein generating one or more images representing the portion of the environment external to the HMD from the selected rays of light captured by the light field camera that are projected to intersect the plane in the virtual position of the light field camera and corresponding to the field of view of the light field camera comprises:
retrieving intensity information corresponding to each of the selected rays of light projected to intersect the plane in the virtual position of the light field camera corresponding to the field of view of the light field camera; and
generating an image so an intensity at a position within the image corresponds to intensities of selected rays of light projected to intersect the plane in the virtual position of the light field camera corresponding to the field of view of the light field camera at the position.

6. The method of claim 5, wherein generating the image so the intensity at the position within the image corresponds to intensities of selected rays of light projected to intersect the plane in the virtual position of the light field camera corresponding to the field of view of the light field camera at the position comprises:
retrieving color information captured by the light field camera corresponding to selected rays of light projected to intersect the plane in the virtual position of the light field camera corresponding to the field of view of the light field camera; and
generating the image so a color at the position within the image corresponds to color information of selected rays of light projected to intersect the plane in the virtual position of the light field camera corresponding to the field of view of the light field camera at the position.

7. A system comprising:
a head mounted display (HMD) including:
a light field camera coupled to the HMD configured to capture information about light from an environment external to the HMD and within a field of view of the light field camera, the light field camera having a specific position on the HMD relative to an eye of a user wearing the HMD and positioned on the HMD so the field of view of the light field camera is external to the HMD; and
a camera configured to capture one or more images of a portion of a face of the user wearing the HMD, the portion of the face of the user including the eye of the user; and
a console configured to receive information about light from the environment external to the HMD from the light field camera and to receive the one or more images of the portion of the face of the user wearing the HMD from the camera, the console configured to:
determine a virtual position of the light field camera based on the specific position of the light field camera on the HMD relative to the eye of the user wearing the HMD and the one or more images of the portion of the face of the user wearing the HMD by
obtaining an image of the user's eye from a camera included in the front rigid body that is directed towards the user's eye and that has specific position relative to a portion of the HMD, and
determining a position of the user's eye from the image and the specific position relative to the portion of the HMD, the virtual position of the light field camera comprising the determined position of the user's eye;
select rays of light captured by the light field camera projected to intersect a plane in the virtual position of the light field camera and corresponding to the field of view of the light field camera; and
generate one or more images representing a portion of the environment external to the HMD from the selected rays of light captured by the light field camera that are projected to intersect the plane in the virtual position of the light field camera and corresponding to the field of view of the light field camera.

8. The system of claim 7, wherein determine the virtual position of the light field camera based on the specific position of the light field camera on the HMD relative to the eye of the user wearing the HMD and the one or more images of the portion of the face of the user wearing the HMD comprises:
obtain a specific horizontal distance from a center of an eyecup assembly included in the HMD from the light field camera;
obtain a specific vertical distance from the center of the eyecup assembly included in the HMD from the light field camera; and
determine the position of the eye of the user within the HMD from the one or more images of the eye of the user obtained from the camera, the specific position of the camera relative to the one or more portions of the HMD, the specific horizontal distance, and the specific vertical distance.

9. The system of claim 7, wherein the information about light from the environment external to the HMD comprises intensity and direction of rays of light external to the HMD captured by the light field camera.

10. The system of claim 9, wherein select rays of light captured by the light field camera projected to intersect the plane in the virtual position of the light field camera and corresponding to the field of view of the light field camera comprises:
project rays of light captured by the light field camera to the virtual position based on the direction of rays of light external to the HMD captured by the light field camera; and
select rays of light projected to intersect the plane in the virtual position of the light field camera corresponding to the field of view of the light field camera.

11. The system of claim 10, wherein generate one or more images representing the portion of the environment external to the HMD from the selected rays of light captured by the light field camera that are projected to intersect the plane in the virtual position of the light field camera and corresponding to the field of view of the light field camera comprises:
retrieve intensity information corresponding to each of the selected rays of light projected to intersect the plane in the virtual position of the light field camera corresponding to the field of view of the light field camera; and generate an image so an intensity at a position within the image corresponds to intensities of selected rays of light projected to intersect the plane in the virtual position of the light field camera corresponding to the field of view of the light field camera at the position.

12. The system of claim 11, wherein generate the image so the intensity at the position within the image corresponds to intensities of selected rays of light projected to intersect the plane in the virtual position of the light field camera corresponding to the field of view of the light field camera at the position comprises:

retrieve color information captured by the light field camera corresponding to selected rays of light projected to intersect the plane in the virtual position of the light field camera corresponding to the field of view of the light field camera; and generate the image so a color at the position within the image corresponds to color information of selected rays of light projected to intersect the plane in the virtual position of the light field camera corresponding to the field of view of the light field camera at the position.

13. A computer program product comprising a non-transitory computer readable storage medium having instructions encoded thereon that, when executed by a processor, cause the processor to:

capture information about light from an environment external to a head mounted display (HMD) using a light field camera positioned on the HMD so a field of view of the light field camera is external to the HMD, the light field camera having a specific position on the HMD relative to an eye of a user wearing the HMD;

determine a virtual position of the light field camera based on the specific position of the light field camera on the HMD relative to the eye of the user wearing the HMD by obtaining an image of the user's eye from a camera included in the front rigid body that is directed towards the user's eye and that has specific position relative to a portion of the HMD, and determining a position of the user's eye from the image and the specific position relative to the portion of the HMD, the virtual position of the light field camera comprising the determined position of the user's eye;

select rays of light captured by the light field camera projected to intersect a plane in the virtual position of the light field camera and corresponding to the field of view of the light field camera; and generate one or more images representing a portion of the environment external to the HMD from the selected rays of light captured by the light field camera that are projected to intersect the plane in the virtual position of the light field camera and corresponding to the field of view of the light field camera.

14. The computer program product of claim 13, wherein the information about light from the environment external to the HMD comprises intensity and direction of rays of light external to the HMD captured by the light field camera.

15. The computer program product of claim 14, wherein select rays of light captured by the light field camera projected to intersect the plane in the virtual position of the light field camera and corresponding to the field of view of the light field camera comprises:

project rays of light captured by the light field camera to the virtual position based on the direction of rays of light external to the HMD captured by the light field camera; and select rays of light projected to intersect the plane in the virtual position of the light field camera corresponding to the field of view of the light field camera.

16. The computer program product of claim 15, wherein generate one or more images representing the portion of the environment external to the HMD from the selected rays of light captured by the light field camera that are projected to intersect the plane in the virtual position of the light field camera and corresponding to the field of view of the light field camera comprises:

retrieve intensity information corresponding to each of the selected rays of light projected to intersect the plane in the virtual position of the light field camera corresponding to the field of view of the light field camera; and generate an image so an intensity at a position within the image corresponds to intensities of selected rays of light projected to intersect the plane in the virtual position of the light field camera corresponding to the field of view of the light field camera at the position.

\* \* \* \* \*